United States Patent
Hell

(10) Patent No.: US 12,306,063 B2
(45) Date of Patent: May 20, 2025

(54) COUPLING MODULE FOR A DRIVE TRAIN TEST STAND, OUTPUT MODULE, AND DRIVE TRAIN TEST STAND

(71) Applicant: ZF Friedrichshafen AG, Friedrichshafen (DE)

(72) Inventor: Christian Hell, Untergriesbach (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 233 days.

(21) Appl. No.: 18/042,489

(22) PCT Filed: Aug. 31, 2021

(86) PCT No.: PCT/EP2021/073943
§ 371 (c)(1),
(2) Date: Feb. 22, 2023

(87) PCT Pub. No.: WO2022/049047
PCT Pub. Date: Mar. 10, 2022

(65) Prior Publication Data
US 2023/0324257 A1    Oct. 12, 2023

(30) Foreign Application Priority Data
Sep. 2, 2020 (DE) .................. 10 2020 211 025.5

(51) Int. Cl.
*G01M 13/025* (2019.01)
*F16D 1/076* (2006.01)
*G01M 15/02* (2006.01)

(52) U.S. Cl.
CPC ........... *G01M 13/025* (2013.01); *F16D 1/076* (2013.01); *G01M 15/02* (2013.01)

(58) Field of Classification Search
CPC .. G01M 13/025; G01M 15/02; G01M 17/013; G01M 17/02; F16D 1/076
See application file for complete search history.

(56) References Cited

U.S. PATENT DOCUMENTS 1,802,148 A     4/1931  Hatfield
3,977,243 A *   8/1976  Yamada .............. G01M 17/022
                                                    73/146

(Continued)

FOREIGN PATENT DOCUMENTS

DE           43 28 537 A1    3/1995
DE      10 2012 018 359 A1   3/2013
EP          2 602 602 A1     6/2013

OTHER PUBLICATIONS

European Patent Office, International Search Report issued in International patent application No. PCT/EP2021/073943 (Jan. 10, 2022).

(Continued)

*Primary Examiner* — Eric S. McCall
(74) *Attorney, Agent, or Firm* — Finch & Maloney PLLC

(57) ABSTRACT

The invention relates to a coupling module for a drive train test stand for connecting an articulated shaft to a driveshaft. The coupling module includes a wheel rim and a wheel cap. The wheel rim can be rotationally fixed to the driveshaft. The wheel cap has a base surface and a lateral wall. The wheel cap can be rotationally fixed to the articulated shaft. A vehicle wheel is arranged on the wheel rim, the trad of the wheel being in frictional contact with the inner face of the lateral wall of the wheel cap. Also disclosed is a corresponding output module for a drive train test stand and to a drive train test stand for testing a vehicle drive train.

12 Claims, 2 Drawing Sheets

(56) References Cited

U.S. PATENT DOCUMENTS

| | | | | |
|---|---|---|---|---|
| 4,501,139 | A | * | 2/1985 | Petersen ............... G01M 17/06 |
| | | | | 73/116.01 |
| 4,790,791 | A | | 12/1988 | Sumida et al. |
| 6,116,084 | A | * | 9/2000 | Fischer ............... G01M 17/022 |
| | | | | 73/146 |
| 6,382,020 | B1 | * | 5/2002 | Fischer ............... G01M 17/022 |
| | | | | 73/146 |
| 2010/0037714 | A1 | * | 2/2010 | Friske ................. G01M 17/013 |
| | | | | 73/865.9 |
| 2010/0040833 | A1 | | 2/2010 | Quartarone |
| 2014/0311231 | A1 | * | 10/2014 | Braghiroli ............... G01M 1/04 |
| | | | | 73/146 |
| 2018/0095007 | A1 | * | 4/2018 | Mizuta ................ G01M 15/102 |
| 2023/0213411 | A1 | * | 7/2023 | Matsumoto ......... G01M 17/022 |
| | | | | 73/146 |
| 2023/0314279 | A1 | * | 10/2023 | Juse ................... G01M 13/025 |
| | | | | 73/116.01 |

OTHER PUBLICATIONS

European Patent Office, Written Opinion issued in International patent application No. PCT/EP2021/073943 (Jan. 10, 2022).
German Patent Office, German Search Report issued in German patent application No. 10 2020 211 025.5 (Apr. 22, 2021).

* cited by examiner

COUPLING MODULE FOR A DRIVE TRAIN TEST STAND, OUTPUT MODULE, AND DRIVE TRAIN TEST STAND

RELATED APPLICATIONS

This application claims the benefit under 35 U.S.C. § 371 as a U.S. National Phase Application of application no. PCT/EP2021/073943, filed on 31 Aug. 2021, which claims benefit of German Patent Application no. 10 2020 211 025.5 filed 2 Sep. 2020, the contents of which are hereby incorporated herein by reference in their entireties.

FIELD OF THE DISCLOSURE

The invention relates to a coupling module for a drive train test stand for connecting an articulated shaft to a drive shaft, a corresponding output module for a drive train test stand, and a corresponding drive train test stand.

BACKGROUND

Drive train test stands for testing motor vehicle drive trains are known from the prior art. Such drive train test stands are generally used to already identify malfunctions of a drive train at an early stage by means of a series of load tests. Typical malfunctions arise, for example, as a result of components which are subjected to play, such as, for example, gears, synchronizing rings, synchronizing members, multiple plate clutch disks and shafts which can be deflected or which can be excited to carry out vibrations.

In this context DE 10 2012 018 359 A1 describes a driving cycle for a driving simulation which is driven by a real motor vehicle on a roller test stand. The driving of the motor vehicle functions in this instance in such a manner that the wheel speed of the motor vehicle corresponds to the respective speed specification of the driving cycle without the motor vehicle actually moving forward. This enables the motor vehicle drive train to be tested after installation in the motor vehicle.

So-called multi-link drive train test stands are further known to the Applicant and can be connected to the wheel flanges of a motor vehicle in a rotationally secure manner and ensure for the wheel flanges all degrees of freedom which are also possible for the vehicle wheels during regular operation of the motor vehicle with regard to the movement possibilities thereof. The known multi-link drive train test stands comprise to this end a plurality of levers and rotary joints which are arranged in series and which can be moved with respect to each other. The drive train of the motor vehicle is in this instance driven directly by a vehicle-specific drive unit. The articulated shafts of the drive train are the wheel shafts which can be acted on with predeterminable brake torques by the multi-link motor vehicle gear mechanism test stands via the wheel flanges.

DE 43 28 537 C2 discloses a gear test stand having a first servo motor which acts as a drive motor and a second servo motor which acts as a brake motor. The first drive motor is connected by means of a clutch to the drive shaft of a motor vehicle gear mechanism which is intended to be tested and is controlled with regard to the speed thereof by means of a PC, wherein any speed paths can be simulated. The brake motor is connected by means of another clutch to an articulated shaft of the motor vehicle gear mechanism which is intended to be tested. The speed of the second motor is also controlled by means of the PC. The speed paths simulated by the PC are speed paths measured in real road tests. Consequently, the motor vehicle gear mechanism according to DE 43 28 537 C2 can also be tested prior to installation in a motor vehicle.

FIG. 1 shows a wheel cage module 10 which is known in the prior art and which releasably couples a drive axle 11 to an articulated shaft 12. The drive axle 11 is driven by a drive motor which is not illustrated and transmits to the articulated shaft 12 via the wheel cage module a speed and a torque which can be acted on with a counter-force by a brake motor. The wheel cage module is in this instance made of steel and in a similar manner to a conventional wheel rim connected to the drive axle by means of the ring of holes of the wheel rim.

SUMMARY

The known drive train test stands are, however, subjected to disadvantages either in that they are not suitable at all for testing a motor vehicle drive train prior to installation in a vehicle or in that they are at least not capable of reliably testing an electrically driven drive train prior to installation in a vehicle since the behavior of the electric drive train as measured in the test stand does not correspond to a behavior of the drive train which is subsequently installed in the vehicle. The reason for this discrepancy of the behavior measured in the test stand from the behavior installed in the vehicle in an electrically driven drive train is that the electric drive motor in comparison with an internal combustion engine is comparatively hard and non-resilient in terms of its torsional behavior. In addition, an electric drive motor is often located directly on the axle which is driven thereby, which leads to comparatively short drive paths and consequently to further stiffening of the drive train. This low resilience of the electric drive train can, however, be compensated for in the state installed in the vehicle to a significant extent via the rubber tires of the vehicle, but not in the drive train test stand.

An object of the present invention is to provide an improved coupling module for a drive train test stand for connecting an articulated shaft to a drive shaft.

This object is achieved according to the invention by the coupling module for a drive train test stand for connecting an articulated shaft to a drive shaft according to claim 1. Advantageous embodiments will be appreciated from the dependent claims.

The invention relates to a coupling module for a drive train test stand for connecting an articulated shaft to a drive shaft, wherein the coupling module comprises a wheel rim and a wheel cap having a base face and a side wall, wherein the wheel rim can be arranged in a rotationally secure manner on the drive shaft and wherein the wheel cap can be arranged in a rotationally secure manner on the articulated shaft. The coupling module according to the invention is characterized in that there is arranged on the wheel rim an annular damping element which is in frictionally engaging abutment with an inner side of the side wall of the wheel cap.

According to the invention, a coupling module which is suitable for drivingly connecting a drive shaft of a drive train test stand to an articulated shaft of a drive train test stand is thus provided. The drive shaft represents in this instance a shaft which can be driven by a drive motor of the drive train or the drive train test stand. The drive motor of the drive train or the drive train test stand is preferably an electric drive motor. In particular, the drive shaft of the drive motor cannot be driven directly but instead indirectly by means of a transmission stage or a switchable gear mechanism. From a technical viewpoint, the drive shaft in the context of the invention may consequently also be the articulated shaft of the transmission stage or the gear mechanism.

The drive shaft together with the drive motor which drives it may in this instance advantageously be in the form of a drive train which is provided for installation in a vehicle, that is to say, the drive shaft is, for example, a driven rigid axle, a driven steering axle or also an individual wheel drive, which are installed in a corresponding vehicle after the testing operation. The vehicle may, for example, be a passenger vehicle, a truck, a utility vehicle or also a construction or processing machine.

The coupling module comprises a wheel rim which may be in the form in particular of a conventional wheel rim for use on a motor vehicle. Furthermore, the coupling module comprises a wheel cap, wherein the wheel cap has a base face and a side wall. The wheel cap is in this instance advantageously in the form of a hollow cylinder, wherein the base face represents a base face of the hollow cylinder and the side face represents the covering face of the hollow cylinder. The wheel cap preferably comprises steel.

Via the wheel rim, the coupling module can be connected to the drive shaft in a rotationally secure manner, in particular via a ring of holes of the wheel rim. Consequently, the coupling module can thus be connected in the manner of a conventional wheel rim to the drive shaft of the drive train.

Via the wheel cap, the coupling module can also be connected in a rotationally secure manner to the articulated shaft, in particular via a flange connection. The articulated shaft is advantageously driven by an electric loading motor, which can introduce brake torques into the drive train which are directed counter to the drive torques of the drive motor. A dynamic loading of the drive train can thereby be simulated.

The coupling module according to the invention is characterized in that there is arranged on the wheel rim an annular damping element which in particular with the radial outer circumference thereof is in frictionally engaging abutment with an inner side of the side wall of the wheel cap. Consequently, a torque can be transmitted from the drive shaft via the wheel rim and the damping element to the side wall of the wheel cap and consequently to the articulated shaft.

The annular damping element experiences in this instance the torsional vibration damping properties of an actual vehicle tire and is in particular mounted as a vehicle tire on the wheel rim.

Advantageously, the damping element has on the radial outer circumference thereof a profiled running face in the manner of an actual vehicle tire.

The damping element may, for example, be produced from a damping elastomer material or a tire rubber. Furthermore, the damping element may be in the form of an inflatable hollow member or constructed in a solid manner.

This affords the advantage that the coupling module according to the invention ensures a resilience of the drive train in the drive train test stand which corresponds to the actual resilience of the drive train in the state installed in the vehicle. This is because, by the torque of the drive motor being transmitted via a wheel rim and the damping element, the invention makes use of the recognition that the actual behavior of the drive train in the state installed in the vehicle is determined to a decisive extent by the resilience of the vehicle tire which comprises rubber. Consequently, as a result of the coupling module according to the invention, a significantly more realistic testing of the drive train than was previously usual in the prior art can be carried out. The invention thus attempts not only, as often conventional in the prior art, to simulate a specific behavior of the drive train, but also adapts the characteristics which determine to a decisive extent the behavior of the drive train in the state actually installed in the vehicle.

Preferably, there is provision for the inner side of the side wall of the wheel cap to have a coating which increases the friction coefficient of the damping element at the inner side. Consequently, with high torques, a spinning of the damping element in the wheel cap can also be prevented.

In a particularly preferred manner, the coating is an asphalt coating. This enables a realistic behavior of the damping element in the wheel cap as far as possible.

According to another preferred embodiment of the invention, there is provision for the damping element to be in the form of a vehicle tire which is in frictionally engaging abutment with the running face thereof with an inner side of the side wall of the wheel cap. By the damping element being in the form of a vehicle tire, a completely realistic behavior of the drive train can be produced during the test operation.

Advantageously, there is provision for the vehicle tire to be filled with compressed air only after it has been arranged in the wheel cap. If the vehicle tire is filled with compressed air only after it has been arranged in the wheel cap, it expands radially outward and thereby moves into abutment with the side wall. This also promotes a simple arrangement of the vehicle tire in the wheel cap.

According to another preferred embodiment of the invention, there is provision for the wheel cap to have a support ring which is arranged at an end, opposite the base face of the wheel cap, of the side wall of the wheel cap. Consequently, the damping element or the vehicle tire is not only enclosed radially by the inner side of the side wall of the wheel cap and enclosed from a first axial side by the base face, but furthermore also enclosed from a second axial side by the support ring. This affords the advantage that the side wall is also stabilized at the axial end opposite the base face and both axial ends are secured in particular against radial bending open, for example, as a result of the vehicle tire being filled with compressed air and a resulting expansion. The support ring thus secures the side wall against undesirable deformation and consequently also ensures a larger possible pressing pressure of the damping element or the running face of the vehicle tire against the side wall since the side wall cannot resiliently give way to the pressing pressure of the vehicle tire.

The support ring may enclose the second axial side of the damping element or the vehicle tire either only partially or also completely. With an only partial enclosure, the support ring is preferably arranged in the radially outer region of the damping element or the vehicle tire and secured to the side wall of the coupling module.

According to a particularly preferred embodiment of the invention, there is provision for the support ring to be releasably arranged on the wheel cap. This affords the advantage that an assembly or disassembly of the vehicle tire is not made more difficult by the support ring.

According to another particularly preferred embodiment of the invention, there is provision for the support ring to be connected to the wheel rim at the inner circumference thereof by means of a support bearing. This affords the advantage that via the support bearing the stability of the coupling module can be increased in particular at high speeds or in highly dynamic test methods.

If the coupling module has the additional support bearing, a conventional wheel rim is preferably not used, but instead a special rim which has a corresponding bearing face for supporting the support bearing.

According to another preferred embodiment of the invention, there is provision for a centering bearing for centering the wheel cap on the wheel rim to be arranged in the base face. To this end, the wheel rim may, for example, have a radially central projection on which the centering bearing can be supported. The centering bearing improves the centering precision of the articulated shaft with respect to the drive shaft and consequently reduces an imbalance of the coupling module in particular at high speeds and in highly dynamic test methods.

In order to support the centering bearing on the drive-side portion of the coupling module, an adapter piece which is particularly constructed in a cylindrical manner and which has an open and a closed axial end can preferably be used. At the open axial end, there is preferably provided a ring of holes which enables a rotationally secure arrangement of the adapter piece on the ring of holes of the wheel rim by means of screwing. For example, the adapter piece can be arranged together with the wheel rim on the drive shaft so that the ring of holes of the wheel rim and the ring of holes of the adapter piece are arranged in a congruent manner over the ring of holes of the drive shaft and both the wheel rim and the adapter piece are retained by the same screws which protrude through the wheel rim and the adapter piece and which engage in the drive shaft. At the closed axial end there is preferably provided a projection which promotes an arrangement of the centering bearing.

According to another preferred embodiment of the invention, there is provision for the base face to be in the form of a grid face or a segment face having bracket arms. That is to say that the base face is not therefore in the form of a solid "plate" but can instead be constructed with intermediate spaces or intermediate faces which are free from materials. The number of bracket arms may in this instance be selected as necessary and, depending on a material thickness or torque transmission capability, the grid depth may also be selected accordingly. The bracket arms represent in this instance connection struts which connect the side wall of the wheel cap to a connection location for the articulated shaft and thus transmit the torque transmitted to the side wall from the tire to the articulated shaft. The grid face also directs the torque transmitted from the tire to the side wall to the articulated shaft. As a result of the construction as a grid face or as a segment face having bracket arms, the advantage is afforded that material can be saved, whereby the coupling module according to the invention is lighter and more cost-effective and in particular has a lower mass inertia. In addition, the vehicle tire is also accessible from the side of the base face.

According to another preferred embodiment of the invention, there is provision for the side wall to be in the form of a clampable side wall. A clampable side wall is intended to be understood to be a side wall of which the circumference can be changed mechanically so that it can be clamped around the running face of the vehicle tire. This enables, on the one hand, a comparatively simple assembly of the damping element or the vehicle tire in the coupling module and, on the other hand, a reliable clamping of the vehicle tire in the coupling module for the test mode. In particular, this is because the vehicle tire does not have to be brought into abutment with the side wall by inflating the vehicle tire, whereby an already completely inflated vehicle tire can be assembled. In addition, the frictional engagement between the inner face of the side wall and the running face of the vehicle tire can be increased in this manner since the pressing pressure may be greater. Consequently, greater torques can also be transmitted.

According to another preferred embodiment of the invention, there is provision for the inner side of the side wall to have at least one latch segment. A latch segment in this instance is intended to be understood to be a deviation from the circular shape in the form of a circle chord which forms a segment and on which the damping element or the vehicle tire is positioned with the running face thereof and forms a so-called latch. Since during actual operation of the vehicle tire on the motor vehicle the force transmission from the vehicle tire to the road is carried out exclusively by means of the latch, as a result of the latch segment a particularly realistic test behavior and force transmission behavior can consequently be produced by the coupling module. Where applicable, a plurality of latch segments may also be provided, whereby, for example, the rigidity with respect to the torque transmission behavior of the coupling module can be increased. Generally, in this instance, the rigidity increases the more latch segments are provided.

According to another preferred embodiment of the invention, there is provision for the damping element or the running face of the vehicle tire to be exclusively in abutment with the at least one latch segment. Consequently, a completely realistic torque transmission behavior of the coupling module can be produced.

The invention further relates to an output module for a drive train test stand comprising an electric loading motor and a coupling module according to the invention. This also leads to the advantages already described in connection with the coupling module according to the invention for the output module according to the invention.

Finally, the invention also relates to a drive train test stand for testing a vehicle drive train, comprising at least one output module according to the invention. This leads to the advantages already mentioned.

BRIEF DESCRIPTION OF THE DRAWINGS

The invention will be explained below with reference to embodiments illustrated in the Figures by way of example.

In the Figures.

Figure 1:
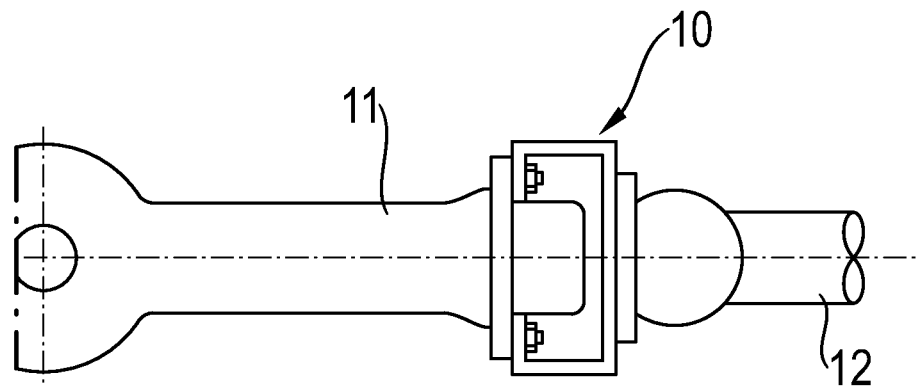
FIG. 1 shows a wheel cage module known in the prior art.

Identical objects, functional units and comparable components are given the same reference numerals across all the Figures. These objects, functional units and comparable components are with regard to their technical features configured identically unless otherwise stated explicitly or implicitly in the description.

DETAILED DESCRIPTION

FIG. 1 shows a wheel cage module 10 which is known in the prior art and which releasably connects a drive axle 11 to an articulated shaft 12.

Figure 2:
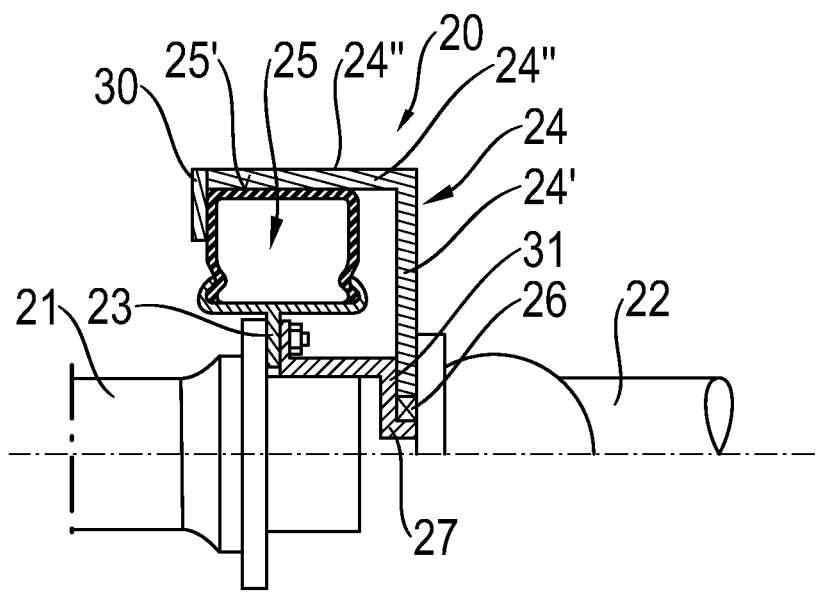
FIG. 2 shows by way of example and schematically one possible construction of a coupling module according to the invention for connecting an articulated shaft to a drive shaft.

FIG. 2 shows by way of example and schematically one possible construction of a coupling module 20 according to the invention for connecting an articulated shaft 22 to a drive shaft 21. The drive shaft 21 is, for example, driven by means of an electric motor (not illustrated in FIG. 2) which is arranged directly on the drive shaft 21 and which is fixedly associated with the drive shaft 21, that is to say, which also actually drives the drive shaft 21 during actual travel operation in the motor vehicle. The coupling module 20 comprises a wheel rim 23 which is a conventional wheel rim 23 as can also be mounted on motor vehicles in road traffic. The coupling module 20 further comprises a wheel cap 24, having a base face 24' and a side wall 24". There is enclosed by the wheel cap 24 a damping element 25 which is in the form of a vehicle tire 25 and which is arranged on the wheel rim 23 and which is in frictionally engaging abutment with the running face 25' thereof with an inner side 24''' of the side wall 24" of the wheel cap 24. This results with regard to the torque transmission behavior of the coupling module 20 in very realistic properties since the resilience of the vehicle tire 25 is used as during real driving operation. The torque is in this instance first transmitted from the drive shaft 21 to the wheel rim 23 and then from the wheel rim 23 to the vehicle tire 24. The vehicle tire 24 transmits the torque in accordance with the resilient properties thereof over the running face 25' thereof to the inner side 24''' of the side wall 24" of the wheel cap 24. The wheel cap 24 in turn transmits the torque via the base face 24' thereof to the articulated shaft 22.

The exemplary coupling module 20 of FIG. 2 further comprises a support ring 30 which is releasably arranged by means of a screw connection at an end, opposite the base face 24' of the wheel cap 24, of the side wall 24" of the wheel cap 24. As a result of the support ring 30, a resilient yielding in the form of radial bending open of the side wall 24" at the axial end, facing the support ring 30, of the side wall 24" can be prevented.

Finally, the coupling module 20 of FIG. 2 also comprises a centering bearing 26 for centering the wheel cap 24 on the wheel rim 23. The coupling module 20 is in this instance supported by means of the base face 24' thereof on a projection 27 of an adapter piece 31 which is connected to the wheel rim 23 by means of a screw connection via the ring of holes. The centering bearing 26 improves the uniformity of the coupling module 20 in particular at high speeds and in highly dynamic test methods.

Figure 3:
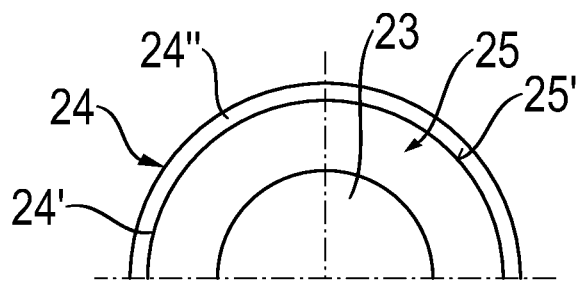
FIG. 3 shows a cross section through the coupling module of FIG. 2.

FIG. 3 shows a cross section through the coupling module 20 of FIG. 2. In this instance, it is possible to see the side wall 24" with the inner side 24''' of the wheel cap 24. The vehicle tire 25 is arranged in the wheel cap 24 with the running face 25' thereof, wherein the running face 25' is in frictionally engaging abutment with the inner side 24" so that a torque transmission is possible. The vehicle tire 25 is arranged on the wheel rim 23.

Figure 4:
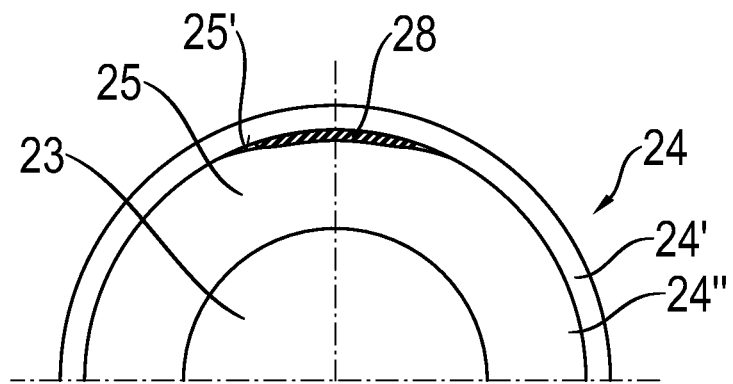
FIG. 4 shows the cross section through the coupling module of FIG. 2 with a latch segment.

FIG. 4 shows the cross section of FIG. 3, but the inner side 24" of the side wall 24' has by way of example a latch segment 28. The latch segment 28 leads to the vehicle tire 25 in the clamped state in the wheel cap 24 as during real travel operation forming on the motor vehicle a latch, via which the complete torque is transmitted. For example, in FIG. 4 remote from the latch segment 28 there is an air gap between the running face 25' of the vehicle tire 25 and the inner side 24" of the side wall 24'.

Figure 5:
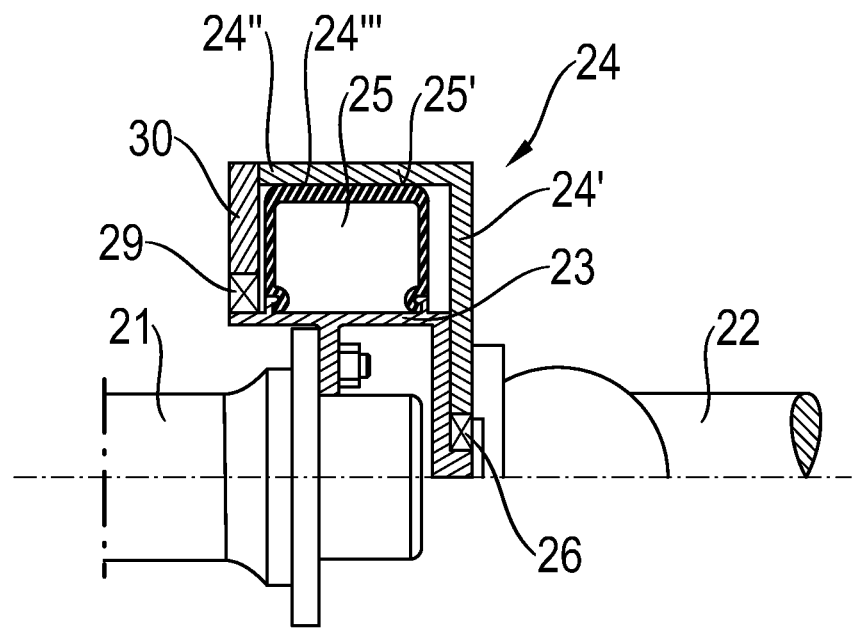
FIG. 5 shows schematically and by way of example another possible construction of a coupling module according to the invention for connecting an articulated shaft to a drive shaft.

FIG. 5 shows schematically and by way of example another possible construction of a coupling module 20 according to the invention for connecting an articulated shaft 22 to a drive shaft 21. The coupling module 20 of FIG. 5 differs from the coupling module 20 of FIG. 2 only in that in place of a conventional wheel rim 23 a specially produced wheel rim 23 which enables the provision of a support bearing 29 is used. This affords the advantage that via the support bearing 29 the stability of the coupling module 20 can be increased, in particular at high speeds or in highly dynamic test methods. The support ring 30 is extended radially inwardly to a corresponding extent in order to engage on the support bearing 29.

LIST OF REFERENCE NUMERALS

10 Wheel cage module
11 Drive axle
12 Articulated shaft
20 Coupling module
21 Drive shaft
22 Articulated shaft
23 Wheel rim
24 Wheel cap
24' Base face
24" Side wall
24''' Inner side
25 Damping element, vehicle tire
25' Running face
26 Centering bearing
27 Projection
28 Latch segment
29 Support bearing
30 Support ring
31 Adapter piece

The invention claimed is:

1. A coupling module for a drive train test stand for connecting an articulated shaft to a drive shaft, wherein the coupling module comprises:
    a wheel rim configured to be rotationally fixed on the drive shaft;
    a wheel cap having a base face and a side wall, the wheel cap configured to be rotationally fixed on the articulated shaft; and
    an annular damping element on the wheel rim and arranged in frictionally engaging abutment with an inner side of the side wall of the wheel cap.

2. The coupling module as claimed in claim 1, wherein the annular damping element comprises a vehicle tire having a running face arranged in frictionally engaging abutment with an inner side of the side wall of the wheel cap.

3. The coupling module as claimed in claim 1, wherein the base face has a centering bearing configured for centering the wheel cap on the wheel rim.

4. The coupling module as claimed in claim 1, wherein the base face defines a plurality of openings or recesses arranged in a grid.

5. The coupling module as claimed in claim 1, wherein the side wall is configured to be clamped.

6. An output module for a drive train test stand comprising:
    an electric loading motor; and
    the coupling module of claim 1.

7. The coupling module as claimed in claim 1, wherein the inner side of the side wall has at least one latch segment.

8. The coupling module as claimed in claim 7, wherein the damping element or the running face of the vehicle tire is exclusively in abutment with the at least one latch segment.

9. The coupling module as claimed in claim 1, wherein the wheel cap has a support ring at an end of the sidewall and spaced from the base face by the sidewall.

10. The coupling module as claimed in claim 9, wherein the support ring is releasably arranged on the wheel cap.

11. The coupling module as claimed in claim 9, wherein the support ring is connected to an inner circumference of the wheel rim by a support bearing.

12. A drive train test stand for testing a vehicle drive train, comprising:
- an electric loading motor; and
- a coupling module coupling module comprising:
  - a wheel rim configured to be rotationally fixed on the drive shaft;
  - a wheel cap having a base face and a side wall, the wheel cap configured to be rotationally fixed on the articulated shaft; and
  - an annular damping element on the wheel rim, the annular damping element arranged in frictionally engaging abutment with an inner side of the side wall of the wheel cap.

* * * * *